United States Patent [19]
Kloeg

[11] 3,732,877
[45] May 15, 1973

[54] DEVICES FOR CLEANING OBJECTS

[76] Inventor: Hermanus Antonius Marie Kloeg, Nautilusstraat 150, Tilburg, Netherlands

[22] Filed: Mar. 29, 1971

[21] Appl. No.: 128,776

[52] U.S. Cl................................134/111, 134/104
[51] Int. Cl..............................................B08b 3/10
[58] Field of Search............................134/111, 104

[56] References Cited

UNITED STATES PATENTS

| | | | |
|---|---|---|---|
| 552,588 | 1/1896 | Rowley | 134/111 |
| 560,673 | 5/1896 | Atkinson | 134/111 X |
| 1,678,796 | 7/1928 | Williams | 134/111 X |
| 2,385,150 | 9/1945 | Miller | 134/111 X |
| 2,568,183 | 9/1951 | Bumpus | 134/111 |
| 2,573,008 | 10/1951 | Gorden | 134/111 |
| 2,649,100 | 8/1953 | Frech | 134/111 X |
| 2,721,566 | 10/1955 | Brucker | 134/111 X |
| 2,808,842 | 10/1957 | Pollock et al. | 134/111 X |
| 3,108,606 | 10/1963 | Brunvogel | 134/111 X |

Primary Examiner—Robert L. Bleutge
Attorney—Nolte & Nolte

[57] ABSTRACT

A washing apparatus has a collecting space for a washing liquid. A duct extends through the wall of the collecting space intermediate the level of the liquid therein and the bottom of the space, the duct being connected to an external filter assembly. Washing liquid is circulated from the filter assembly back to the apparatus. The top of the filter assembly has an aperture to permit access to a filter therein.

5 Claims, 3 Drawing Figures

DEVICES FOR CLEANING OBJECTS

The invention relates to a device for cleaning objects, comprising a washing space, into which liquid is pumped by means of a pump and from which the liquid flows towards a collecting space. The liquid is sucked from the collecting space by the pump, and a filter is provided for filtering the liquid.

In a known device of the kind set forth the liquid flows from the washing space via the filter to the collecting space. The dirt removed from the objects has to be retained in this case by the filter, which, even in the case of a high capacity, will be fairly rapidly clogged so that it has to be cleaned and the production process has to be interrupted.

The invention has for its object to avoid the disadvantages of the known construction described above.

According to the invention this can be achieved by connecting the filter with the collecting space at a point located between the bottom of the collecting space and the liquid level of the liquid contained in the collecting space in normal operation while the liquid is sucked from the collecting space to the pump via the filter.

With this arrangement the heavy dirt can settle on the bottom of the collecting space, whereas the light-weight dirt continues floating on the liquid in the collecting space. Only the dirt suspended in the liquid will be sucked by the pump into the filter, which has to retain the same. With the same filter capacity, the filter can therefore operate effectively for a considerably longer working time. The construction according to the invention furthermore permits of arranging the filter at such an advantageous place that it is readily accessible for cleaning operations. This cannot be achieved in the aforesaid known construction.

For a better understanding of the invention and in order to show how the same may be carried into effect, reference is made by way of example to the accompanying drawing, which shows schematically a few embodiments of a device in accordance with the invention.

Figure 1:
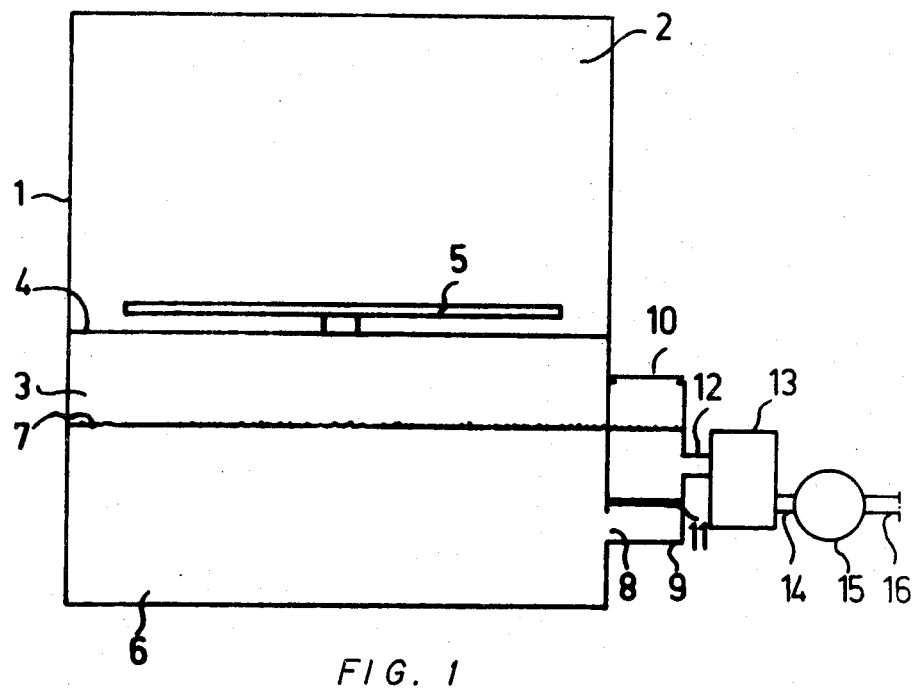
FIG. 1 shows schematically a first device embodying the invention.

The device shown in FIG. 1 comprises a housing 1, in which a washing space 2 and a collecting space 3 for washing liquid are separated from each other by a partition 4. The washing space 2 accommodates a support 5, which is adapted to rotate about a vertical rotary shaft in the washing space 2 and on which objects to be cleaned can be put. For this purpose the washing space 2 is accessible through a door (not shown). The objects can be cleaned with the aid of spray members (not shown) arranged in the washing space 2 for spraying a liquid detergent onto the objects. The cleaning liquid with the dirt released from the objects will flow through openings in the partition 4 into the collecting space 3, containing in normal operation a cleaning liquid 6 up to a level 7.

One of the sidewalls of the housing 1 has an opening 8 at a given distance above the bottom of the collecting space 3 and at a given distance beneath the liquid level 7, through which opening the collecting space 3 communicates with a filter housing 9, secured to the sidewall of the housing 1. The interior of the filter housing 9 is accessible by means of a detachable lid 10 at the top of the filter housing. The filter housing accommodates a filter element, for example, formed by a perforated sheet 11 so that the opening 8 is below the filter 11. At a given distance above the filter element 11 a duct 12 communicates with the filter housing 9 so that the latter communicates with a magnetic filter 13. The magnetic filter 13 communicates through a duct 14 with a pump 15, by means of which the liquid sucked in from the collecting space via the filter housing 9 and the magnetic filter 13 is pumped through a duct 16 to the spraying members arranged in the washing space 2.

In operation the washing liquid pumped by the pump 15 into the washing space 2 will flow together with the dirt rinsed from the objects arranged in the washing space through the openings in the partition 4 into the collecting space 6. The heavy dirt will settle on the bottom of the collecting space 6, whereas the light-weight dirt will float at the level 7 of the liquid. Only suspended dirt will remain in the liquid contained in the collecting space 6. The liquid is sucked out of the collecting space by the pump 15 so that the liquid flows through the opening 8 into the filtering housing 9, from where it flows through the filter element 11 and the magnetic filter 13 to the pump. The filter 11 need only retain the dirt suspended in the liquid, whilst any metal particles having passed through the filter are withheld in the magnetic filter 13 so that damage to the pump is avoided. Because the filter housing 9 is arranged outside the housing 1 of the cleaning device, the filter is readily accessible after loosening the lid 10 so that it can be rapidly exchanged or cleaned. As a result, even during the rare periods of exchange of the filter the operation of the cleaning device need not be interrupted for a long time. This embodiment enables the satisfactory use of a long, rectangular filter element 11, which will become clogged only after a very long time, while the dirt will collect mainly from the point where the liquid is sucked towards the end(s) of the filter lying at a distance therefrom.

Figure 2:
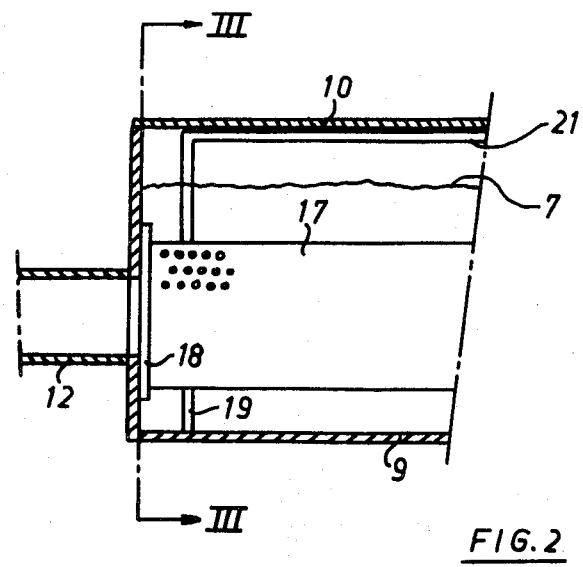
FIG. 2 shows a portion of a filter suitable for use in a further device embodying the invention.
Figure 3:
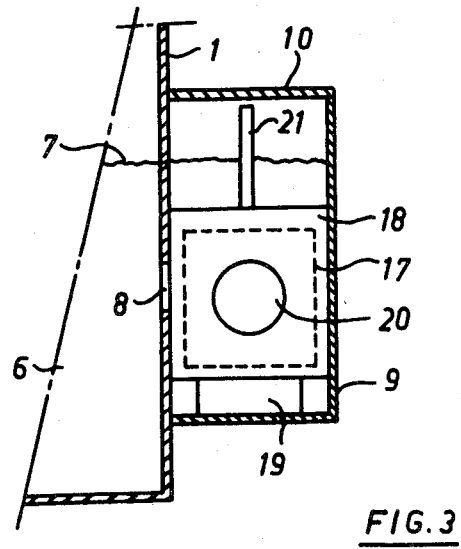
FIG. 3 is a sectional view of the device of FIG. 2 taken on the line III—III in FIG. 2.

The construction and the operation of the modified device of which a portion is shown in FIGS. 2 and 3 corresponds at least substantially with that of the device shown in FIG. 1. Corresponding parts are designated by the same reference numerals. In this embodiment the filter element is formed by an elongated, perforated cylinder 17, closed at the ends by means of plates 18. In normal operation the filter 17 is held by means of legs fastened to the filter 19 on the bottom of the filter housing 9. In this position of the filter an opening 20 provided in one of the plates 18 is located opposite the mouth of the suction duct 12 of the pump 15 communicating with the filter housing. It will be apparent that the plate 18 directly engages the wall of the filter housing 9 and that in operation liquid is sucked via the duct 12 from the interior of the filter 17, whereas the liquid is conducted from the collecting space 6 via the opening 8 around the filter 17 into the filter trough 9. It will be seen that thus a particularly large filter surface can be accommodated in a comparatively small space.

From FIGS. 2 and 3 it will furthermore be seen that at the top side of the filter a handle 21 is fastened, which projects above the liquid level. When the filter is removed by hand, it is thus not necessary to touch the usually hot liquid. The handle 21 may in addition be made from material of poor thermal conductivity.

When soiled, the filter can be readily exchanged with a clean filter. The soiled filter can be easily cleaned.

I claim:

1. In a cleaning apparatus of the type having a washing space with support means therein for holding objects to be washed, a collecting space for collecting washing liquid from said washing space, said collecting space having a surrounding wall, a pump, filter means, and conduit means for connecting said pump to said collecting space by way of said filter means and for returning washing liquid from said collecting space to said washing space, and wherein during use said collecting space is normally filled to a predetermined level with said washing liquid; the improvement wherein said filter means is positioned externally of the wall of said collecting space, and said conduit means comprises an aperture in the wall of said collecting space through which said washing liquid may flow to said filter means, said aperture being positioned above the bottom of said collecting space and below said predetermined level for inhibiting the flow of unsuspended and nonfloating material from said collecting space to said filter means.

2. The apparatus of claim 1 wherein said filter means comprises a filter housing and a filter element in said housing and positioned at a level above said aperture, and said conduit means further comprises duct means extending between said pump and said filter housing at a point in said filter housing above said filter element.

3. The apparatus of claim 1 wherein said filter means comprises a filter housing and a tubular filter element within said housing, said conduit means comprising means directing the flow of fluid from said aperture into said housing externally of said filter element, and means directing the flow of washing liquid to said pump from internally of said filter element.

4. The apparatus of claim 1 wherein said filter means comprises a filter housing, a filter element positioned within said housing for filtering said washing liquid, and a handle on said filter element, said handle projecting upwardly to a position above the level of said washing liquid within said housing.

5. The apparatus of claim 1 further comprising a magnetic filter positioned in said conduit means between said filter means and said pump.

* * * * *